INVENTOR.
WAYNE M. ROSS
BY Reynolds, Beach & Christensen
ATTORNEYS

Dec. 27, 1955     W. M. ROSS     2,728,899
RECEIVER BLANKING CIRCUIT FOR PULSE
TRANSMISSION-RECEPTION SYSTEMS
Original Filed Aug. 3, 1948     2 Sheets-Sheet 2

INVENTOR.
WAYNE M. ROSS
BY
Reynolds, Beach & Christensen
ATTORNEYS

United States Patent Office 2,728,899
Patented Dec. 27, 1955

2,728,899

RECEIVER BLANKING CIRCUIT FOR PULSE TRANSMISSION-RECEPTION SYSTEMS

Wayne M. Ross, Seattle, Wash., assignor to Minneapolis-Honeywell Regulator Company, Minneapolis, Minn., a corporation of Delaware Original application August 3, 1948, Serial No. 42,239, now Patent No. 2,599,586, dated June 10, 1952. Divided and this application February 16, 1952, Serial No. 271,962

3 Claims. (Cl. 340—3)

This invention relates to receiver blanking circuits and in its preferred application comprises an improved arrangement for blanking the receiver of a pulse-echo object locating system during and immediately following pulse transmission, as a means of preventing directly-received energy of the transmitted pulse and such after effects as circuit transients and spurious reflections from local fixtures and the like, from passing the receiver and impairing operation of the system indicator. The invention is intended chiefly for use in pulse-echo type systems such as ultrasonic marine depth finders and submarine locators, radar systems, radio altimeters, and the like, wherein some of the transmitted pulse energy enters the receiver directly either because the same antenna is used for transmission and reception or because of an equivalent arrangement.

The present patent application is a division of my earlier-filed copending application Serial No. 42,239, filed August 3, 1948, now Patent #2,599,586, issued June 10, 1952, and entitled Marine Depth Finder. The invention of present concern is herein illustratively described by reference to the preferred form thereof as applied to the marine depth finder disclosed in the above-cited patent application and as depicted in the accompanying drawings forming a part of the present specification, but it should be understood that certain detailed variations and modifications therein may be made without departing from the underlying essentials involved and without exceeding the scope of the appended claims directed thereto.

The particular marine depth finder system referred to above incorporates a continuous automatic indicator circuit the operation of which requires cyclical triggering by received echoes representing pulse energy reflected from a surface or object which the system is in process of detecting or locating. It is important to the accuracy of the system that transmitted pulse energy together with circuit transients and spurious echoes immediately following the transmitted pulse be precluded from passing through the receiver and prematurely and falsely actuating the indicator circuits.

An object of the present invention is a simple, efficient and relatively inexpensive receiver blanking circuit requiring a minimum of apparatus components additional to those already normally incorporated for other necessary purposes in typical pulse transmission-reception systems. In achieving this objective the improved receiver blanking circuit converts high-frequency energy of the transmitted pulse into a direct voltage impulse and suitably reshapes the latter in order to achieve the desired receiver blanking pulse. The invention thereby avoids the higher cost and complexity of known systems requiring additional or special pulse forming circuitry in order to generate receiver blanking pulses.

A related object, the achievement of which likewise flows in part from the manner of generating the blanking pulse, is the provision of a receiver blanking circuit that operates with unvarying precision without critical adjustments and despite disturbing influences such as supply voltage variations and the like which may adversely affect the operation of conventional pulse generating circuits if used for receiver blanking purposes. By deriving the blanking pulse from or as a conversion of transmitted pulse energy, substantially perfect phase synchronization of the blanking pulse with the transmitted pulse energy is inherently achieved without special problems of adjustment or design.

Described in brief terms, the improved receiver blanking circuit in its preferred form comprises detector means suitably coupled to the transmitter to receive high-frequency energy directly therefrom and to convert such energy into a direct-voltage impulse. This direct-voltage impulse is reshaped, i. e. prolonged, by pulse-lengthening means energized during the transmitted pulse and automatically operable immediately thereafter to prevent said direct-voltage impulse from decaying or returning to zero at once. Thus lengthened, the direct-voltage impulse is applied as a receiver blanking pulse to a suitable bias control element in the receiver channel and effectively blanks or blocks off the receiver channel against passage of not only directly-received energy of the transmitted pulse itself but also spurious echoes and circuit transients occurring immediately thereafter. When the blanking pulse is applied to a final or near-final stage of the receiver channel lengthening of the direct-voltage rectified impulse also insures blanking the receiver against passage of transmitted pulse energy delayed by receiver amplifier circuits because of their finite time constants or pulse phase lag. However, the blanking pulse terminates quickly thereafter, so that the comparatively faint echo signals received following pulse transmission, although they may be impressed on the blanking circuit detector means, are so weak that their application to the bias control element cannot appreciably diminish the gain of the receiver channel at the time of their passage through it for actuating the indicator circuits.

With direct reference to the illustrated form, more specific features of the invention reside in the arrangement wherein the detector means comprises a vacuum tube amplifier and the pulse-lengthening means comprises a storage condenser connected therewith to convert transmitted pulse high-frequency energy into the direct-voltage pulse used for blanking purposes. The finite discharge time of this storage condenser effectively adds length to the direct-voltage impulse for blanking purposes. This is true for two reasons. First, the amplitude of the blanking pulse produced by the detector amplifier means and applied to the bias control element of the receiver channel is materially greater than the minimum bias voltage necessary to blank the receiver against passage of transmitted pulse energy. Second, although the storage condenser commences its charge immediately upon termination of the transmitted pulse, its increasing voltage follows an exponential curve, so that, viewed graphically, the resulting direct-voltage impulse is materially longer at its base than it is at its top. Therefore the minimum effective bias voltage applied to the bias control element is actually maintained for a material period of time following termination of the transmitted pulse proper, as desired.

The particular circuit disclosed additionally includes a direct-voltage blocking condenser interposed in the connection between the bias control element and the detector means, and a unidirectional rectifier element for removing accumulated charge from the blocking condenser upon termination of the blanking pulse so that the bias control element will not be influenced by residual voltage of the blocking condenser.

These and other features, objects and advantages of the improved blanking circuit will become more fully evident from the following description thereof by reference to the accompanying drawings.

Figure 1:
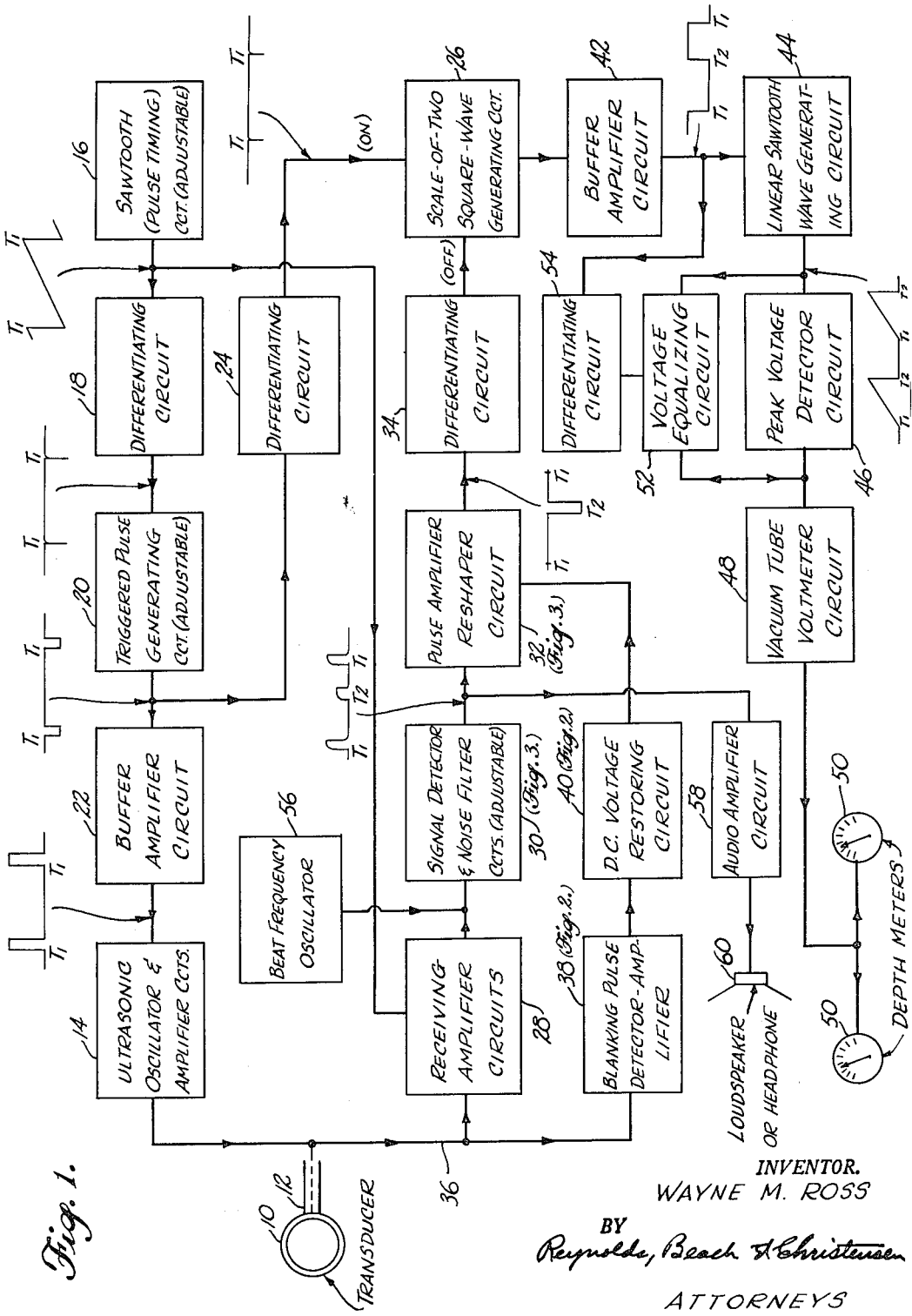
Figure 1 is a block diagram of the complete marine depth finder system in which the present invention is herein illustratively applied.

A more detailed disclosure of the marine depth finder system depicted in Figure 1 is given in my above-cited copending parent application. Sufficient description of that system is included in the present specification, however, to facilitate gaining an understanding of the improved receiver blanking circuit and the nature and purpose of its operation in the illustrative case.

In the figure, the ultrasonic transducer 10 may be of any conventional design adapted for installation at the bottom of a marine vessel. When the transducer is impressed with electric oscillations in the ultrasonic range, i. e., such as 25,000 cycles per second, ultrasonic energy is beamed toward the ocean bottom at the frequency of energization, and upon reflection at low energy level is converted by the transducer into an electric signal capable of amplification and utilization for the purposes described. Because the operating electronic circuits are to be located at a different position on the vessel, energizing electrical impulses and received electric signals are conducted to and from the transducer through a shielded coaxial cable 12. Other features of the system disclosed in said earlier-filed copending patent application are being disclosed and claimed in companion patent applications filed of even date with the present application, one such companion application being entitled Pulse Timing and Receiver Automatic Gain Control in Pulsed Object-Locating Systems and the other, Detecting System.

The transmitting channel of the system includes the ultrasonic oscillator and amplifier circuits 14, preferably of conventional design, periodically pulsed by a suitable modulation system including the sawtooth wave generating circuit or oscillator 16 controlling pulse timing, the differentiating circuit 18 or its equivalent converting the sharp trailing ends of the sawtooth waves into sharp or peaked trigger impulses, the modulating-pulse generating circuit 20 triggered at the sawtooth wave frequency by the output of the differentiating circuit 18, and the buffer amplifier circuit 22 directly modulating the ultrasonic oscillator with the amplified pulses. The waveforms appearing at successive points in the transmitter channel are indicated in the figure, the symbol $T_1$ designating the start of each transmitted pulse. Circuits included in the blocks 14 and 22 are so conventional as to require no particular description or further illustration. Those represented by blocks 16, 18 and 20 may be of conventional form.

The sawtooth-wave timing circuit 16 is made adjustable to control pulse repetition frequency, and the triggered pulse generating circuit 20 is adjustable to control pulse length. Preferably longer pulses (15 milliseconds) are employed at the 200 fathom range and shorter pulses at shorter ranges, such as 10 millisecond pulses at 100 fathoms and 2.5 millisecond pulses at 20 fathoms. By varying the pulse length with range setting in this manner, maximum ratio of signal to noise in the system is more readily attainable by use of adjustable filter circuits in the receiving channel to filter out the random noise without seriously weakening the signal.

The faint electric signals produced in the transducer by the received echoes are amplified in circuits 28, and at resulting greater amplitude are applied to the circuits 30 comprising a signal detector and noise filter circuits. The detected signal impulses are then applied to the pulse amplifier and reshaper circuit 32 which increase their amplitude and restore a sharp or steep leading edge to the pulses partially removed by the process of detection and noise filtering. Such sharp leading edge of the detected pulse is further accentuated in point of time by the differentiating circuit 34 connected to trigger "off" the scale-of-two square wave generating circuit 26.

Modulating pulses generated by circuit 20 are likewise passed through a differentiating or peaking circuit 24 which converts the leading transient edges of each pulse to a sharp impulse of short duration. In this case the resulting sharp impulse is utilized to trigger "on" the square wave generating circuit. The scale-of-two circuit is sometimes referred to as a "flip-flop" circuit. Such a circuit is characterized by its initiation into one static state of operation by application of a first impulse to a control point, and of termination or return to its original state of operation by application to the same or a different control point in the circuit of a second impulse. The circuit is employed in the present instance to generate a voltage wave or pulse having steep leading and trailing edges coincident with the first and second applied pulses. Preferably the wave generated is of square or rectangular form, initiated with the transmitted pulse and terminated with the echo, each pulse cycle. The duration of this square wave therefore precisely equals the time of travel of ultrasonic energy from the vessel to and from the ocean bottom and constitutes a measure of ocean depth.

The square wave from the circuit 26 is utilized to measure and indicate ocean depth in the following manner. After passing through a buffer amplifier circuit 42, the square wave from circuit 26 is applied to a linear sawtooth generating circuit 44. The latter produces a linearly rising voltage commencing at time $T_1$ and terminating at time $T_2$ when the echo is received. Since this rise in voltage is linear the resulting peak amplitudes of the sawtooth voltage waves from circuit 44 become directly proportional to ocean depth, and are detected by a peak voltage detector circuit 46 to produce a steady output voltage which can be read on a galvanometer or other indicator. However, instead of applying the output of peak detector 46 directly to a galvanometer, which would impair the detecting characteristic of the circuit 46 by providing a low impedance discharge path for the storage condenser of the peak detector, this steady voltage is applied first to a vacuum tube volt meter circuit 48 which in turn operates indicating meters 50. A continuous depth indication is thereby produced automatically, accurately and in simple manner, and any number of galvanometers or other indicators may be provided at convenient points throughout the vessel without appreciably adding to the cost.

A triggered voltage equalizing circuit 52 cooperates with the peak voltage detector 46 to enable the latter to respond sensitively to changes in ocean depth no matter how rapid or in what sense they may incur. The voltage equalizing circuit is essentially a one-way switch, triggered or initiated into operation momentarily at time $T_2$, at the end of each sawtooth wave from circuit 44, by a sharp impulse from the differentiating circuit 54 which peaks the transient trailing end of the square wave produced by circuit 26. In a sense, this circuit "compares" at time $T_2$ the instantaneous peak amplitude of the sawtooth voltage with the existing voltage of the charge stored by the condenser in the peak voltage detector circuit 46. It will be evident that the latter is capable of gaining a higher voltage simply by the process of conduction of its detector means, adding charge to the condenser when ocean depth increases and the sawtooth wave peaks rise accordingly above their former value and the steady condenser voltage of the detector circuit. It is likewise important that the condenser retain its charge between sawtooth peaks if its voltage is to be sufficiently steady to prevent flicker of the indicator meters 50. The difficulty, therefore, lay in the condenser being unable to lose its charge sufficiently rapidly to maintain its voltage accurately representative of depth should the ocean depth suddenly decrease. The voltage equalizing circuit 52, which "compares" voltages, as mentioned, overcomes this difficulty by removing excess charge from the condenser, if necessary, in each pulse cycle to prevent discharge of the condenser from lagging behind a drop in sawtooth wave peak amplitudes. The arrangement thereby permits the use of a peak detector circuit with a large time-constant or filter-factor, capable of producing a steady and accurate meter deflection.

Still another feature of the disclosed system, as shown in the block diagram, resides in the provision of a beat frequency oscillator circuit 56 tuned to a frequency near that of the ultrasonic oscillator 14 to produce an audible beat note when mixed in the detector 30 with the received echo signal to enable listening to the signals received. The resulting pulsating output signals from the detector 30 are amplified in the audio amplifier circuit 58 for application to a loud speaker 60 or headphones. From the nature of the audible signal tones thus produced the operator is enabled to recognize the presence of schools of fish in the water or the relative softness of the ocean bottom. The recurring sounds produced from the echo signals are more staccato or sharp when the reflecting ocean bottom is hard, and become slurred or legato with a soft ocean bottom. This enables identifying favorite fishing grounds, for example. The presence of a school of fish is heard as a periodic rushing sound of a duration determined by the depth of the school layer. The pulse repetition rate is set at approximately 50 cycles per minute when the apparatus is used for listening purposes. At this frequency it is also readily possible to listen for the lapsed time interval preceding return of ocean-botton echoes at the greater depths up to 400 fathoms in the described case, when it may be that the automatic depth measuring or indicator circuits of a particular system are not designed or connected up for operation at such depths.

It will be evident that echo signals are much stronger in shallow water than in deep water because of divergence or spread of the transmitted ultrasonic beam, which reduces the sound intensity impinging a unit area of the ocean bottom at greater depths, and also because of the divergence of the reflections. Ordinarily, therefore, the signals from shallows are much stronger than required to operate the sensitive electronic receiving circuits, while those from the greater depths may be so faint as to require maximum receiving sensitivity. It will then be immediately evident that a receiver which equally amplifies echo signals from all depths will tax the capacity of any measuring circuits to respond similarly to the signals which occur at the widely divergent intensities, a condition which is naturally undesirable. Moreover, when listening to the signal sounds it will be more difficult to recognize the identifying signal characteristics if this intensity variation is great. The problem is overcome in simple, effective manner by directly utilizing the sawtooth voltage waves already available from the sawtooth pulse timing circuit 16 and applying such waves as cyclic automatic volume control voltage to the receiving amplifier circuits 28, as indicated in Figure 1. Accordingly, the applied progressively rising sawtooth voltage occurring during each pulse cycle, commencing immediately with the transmission of a pulse and ending with the transmission of the succeeding pulse, progressively raises the gain of the receiver during that interval so that signals in shallow water are amplified less than signals in deep water, generally proportionately. Consequently, no manual control is necessary to adjust detected signal intensity throughout the full operating range of the apparatus, and even if sawtooth frequency is changed with range adjustment, the control is unchanged.

The problem of immediate concern in the present patent application results from the pulses of high intensity ultrasonic energy from the oscillator 14, together with spurious echoes and transient effects, entering or developing in the receiver circuits 28. While the high-level energy tends to overload the amplifier circuits in the receiver, this particular condition may be overcome readily by a simple addition to the receiver amplifier circuits, in the nature of a self-blocking circuit, as disclosed in the earlier filed patent application. However, there remains the more serious problem of directly-received energy of the transmitted pulse passing through the circuit stages 30, 32 and 34 and reaching the scale-of-two circuit 26. If allowed to reach the circuit 26 this transmitted pulse energy, and especially spurious echoes and transients following the transmitted pulse, would arrive at an appreciable time after this circuit is triggered "on" by the differentiating circuit 24. This is true because of the inherent delay encountered in the receiver channel and because of the fact that the last spurious echoes and circuit transients naturally occur after the termination of the transmitted pulse from the oscillator 14. The tendency, therefore, would be to trigger "off" the circuit 26 prematurely or falsely, before reception of the true echo, which is obviously undesirable because it would desensitize the automatic indicator circuits.

In order to completely overcome this difficulty, the transmitted pulse and after effects mentioned are prevented from passing through the receiver channel by application of a blanking pulse to the control element of amplifier 32. Thus, as indicated by the wave forms shown in Figure 1, while the transmitted pulse occurring at time $T_1$ and the echo signal occurring at time $T_2$ are both allowed to pass the detector 30 they are not permitted to pass the pulse amplifier-reshaper circuit 32.

Following application of each blanking pulse, it is desirable to allow immediate recovery of receiver channel sensitivity. To this end a D.-C. restoring circuit 40, forming a part of the receiver blanking circuit proper, is interposed between the detector amplifier 38 and the bias control element of amplifier 32, as later described in greater detail.

Figure 3:
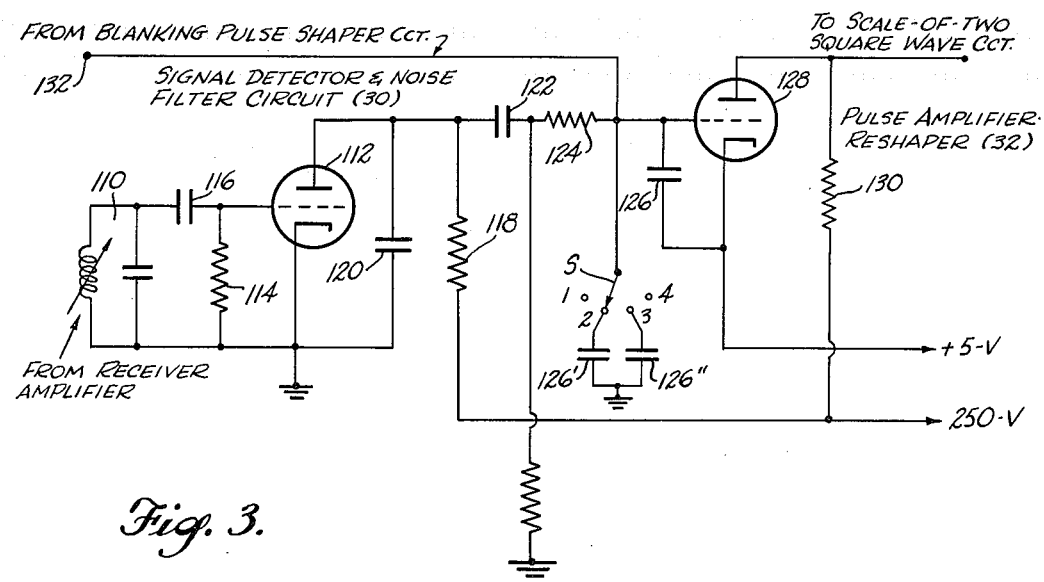
Figure 3 is a schematic circuit diagram of a portion of the receiver channel including an amplifier stage having a bias control element for application of the blanking pulse.

The specific portion of the receiver channel of immediate interest is illustrated schematically in Figure 3 herein. With reference to this figure and to the block diagram of Figure 1, the recurring pulses, both transmitted and received, passing through the receiving amplifier stages, are applied to the tuned circuit 110 in the grid lead of the amplifying grid-leak detector tube 112. This detector circuit includes the grid leak resistor 114, the D.-C. blocking condenser 116 connected between the grid and the tuned circuit 110, the anode resistor 118 and the small (such as 500 micro-micro farads) anode by-pass filter condenser 120 which filters out the ultrasonic oscillations for detection purposes.

Through coupling condenser 122 the detected or rectified signal pulses pass to an integrating type noise filter circuit including the series resistor 124, the shunting condenser 126 and the alternatively selective parallel condensers 126' and 126" connected between grid and cathode of the pulse amplifier-reshaper tube 128. The noise filter circuit 124—126, etc., filters out most of the interference "noise" entering or generated in the receiver channel, but at the same time it necessarily somewhat distorts the received and detected signals by somewhat rounding off the pulse corners or edges. The reason the distortion is not great, or that the signal pulses are not also eliminated by the filter circuits, is that they are of substantially longer duration than most of the noise impulses which appear in the circuit. Changing the setting of the switch S successively through positions 1, 2 and 3, respectively, increases the capacity of the filter (condenser 126" being larger than 126') and enhances the filtering effect. This is done at the higher range settings wherein noise tends to be more prominent and obscure the signals. However, no undesired proportionately greater distortion of the signal occurs from such adjustments, since pulse length is preferably simultaneously also increased to preserve a sufficiently high or maximum signal-to-noise ratio at different range settings.

Any slight rounding or deformation of the pulse by the noise filter circuit is substantially eliminated by passing the signal through the pulse amplifier-reshaper tube 128 having a high amplification factor. The effect is to steepen the leading edge or front of the signal pulses by dint of amplification, and flatten the pulse top because of the anode resistor 130 of the tube 128 being sufficiently large that the tube saturates before the applied signal reaches full amplitude. From the anode of tube 128 the reshaped recurring signal pulses are differentiated and applied to trigger "off" the scale-of-two square wave circuit 26, periodically.

The transmitted pulses detected in the receiver channel are blocked from amplification in tube 128 by application of the negative blanking pulse to the terminal 132 and hence to the control grid of the tube at the same time the detected transmitted pulse also reaches this point in the circuit through the receiver channel. The former is of greater amplitude and of opposite (negative) polarity, hence renders tube 128 nonconductive at that time. Any negative charge which then accumulates on condensers 126, 126', . . ., producing negative bias on the grid of the tube, is lost quickly by discharge through resistor 124, enabling rapid recovery of full amplifier sensitivity to received signals.

Figure 2:
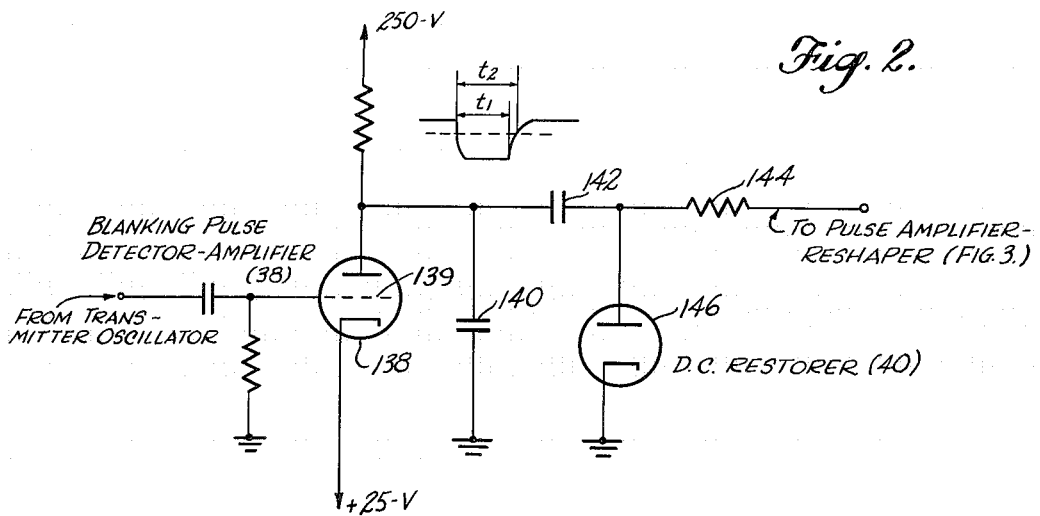
Figure 2 is a schematic circuit diagram of the improved blanking circuit.

Figure 2 illustrates the improved receiver blanking circuit by which a suitable blanking pulse is applied to the control grid or bias control element of tube 128. The ultrasonic transmitted oscillations received directly from transmitting oscillator 14 through conductor 36 are passed through detector means comprising the detector-amplifier tube 138 which rectifies or converts the high-frequency energy into a negative direct-voltage pulse stored on condenser 140. Because of circuit transients, spurious signals and circuit delay in the receiver amplifier stages, the basic direct voltage pulse that attends flow of direct current in amplifier tube 138 during application of transmitted pulse energy to the control grid of this tube will not precisely coincide with or overlap, in point of time, the transmitted pulse energy and after-effects thereof tending to pass through the receiver channel, but will terminate in advance thereof. Therefore, this basic direct-voltage pulse of itself would, if applied to the control grid of amplifier tube 128 without lengthening, cause incomplete blanking of the receiver channel.

The detector-amplifier 138 is shown as a triode tube having its control grid connected to receive high-frequency electrical energy during pulse transmission by the system. The cathode of this tube is returned to a suitable potential normally above that of its control grid as illustrated, so that the tube is normally rendered nonconductive. During application of high-frequency energy to the control grid, however, this bias is overcome and the tube is rendered conductive. A plate load resistor 139 is connected between the anode of the tube and a source of anode voltage shown as 250 volts. The storage or filter condenser 140 has one side connected to ground and its opposite side connected between the load resistor 139 and the anode of tube 138. During conduction of tube 138 the normal voltage existing across condenser 140 is abruptly reduced by an amount which is materially in excess of the required blanking voltage necessary at the control grid of tube 128. The amount of such voltage reduction producing blanking of tube 128 is determined by the division of voltage between the resistance 139 and the resistance of the space discharge path of tube 138. Condenser 140 remains at the reduced voltage throughout the duration of the transmitted pulse applied to the control grid of tube 138, and upon termination of such pulse recharges through resistor 139. The time constant of the recharging circuit comprising resistor 139 and the condenser 140 is sufficiently high that the finite time lapse required for decay of blanking voltage applied to the control grid of tube 128 to a value permitting conduction in such tube substantially equals or exceeds the time lapse required for receiver transients and other undesirable after effects substantially to disappear following the transmitted pulse. With reference to the pulse wave form illustrated in Figure 2, the blanking pulse produced by the combined action of the detector-amplifier tube 138 and the R.-C. circuit comprising resistor 139 and condenser 140 is lengthened from a value $t_1$ representing the duration of the transmitted pulse to the value $t_2$ representing the period beteween the initiation of the transmitted pulse and the point of time at which the voltage on condenser 140 effectively reaches the minimum blanking voltage for tube 128 after termination of the transmitted pulse.

It will therefore be seen that complete blanking of the receiver channel is accomplished due to two factors, one being the finite discharge period of storage condenser 140 connected between the anode of tube 138 and a point of ground potential. The second factor is the design of the circuit such that the amplitude of the direct-voltage pulse produced at the anode of tube 138 for application to the control grid of tube 128 is materially greater than the minimum voltage necessary to blank the receiver channel by biasing the tube 128 below cut-off during application of transmitted pulse energy by the signal detector and noise filter circuit ahead of the tube 128 in the receiver channel. Thus since only part of the full amplitude or value of the blanking pulse is necessary to completely blank the amplifier tube 128 (dotted line, Figure 2), the base of the diagrammed pulse being broadened by the finite discharge time of the condenser 140, the effect is to lengthen the blanking period from a duration $t_1$ to a greater duration $t_2$.

The blanking pulse passes through a direct-current blocking condenser 142 and a series resistor 144 to reach the grid of the amplifier tube 128. A diode tube 146 is connected from between this condenser and resistor to a point of ground potential. The function of this diode is to discharge the coupling condenser 142 immediately following the blanking pulse so that the quiescent voltage or normal bias at the grid of tube 128 is restored immediately following the blanking pulse and the amplifier 128 is thereby returned to normal operating state for reception of echo pulses from the receiver amplifiers.

In conclusion, it will be readily apparent that the timing or phase synchronization of the blanking pulse with the transmitted pulse is inherently accurate and that no critical timing adjustments or complex blanking pulse generating circuits are necessary. The derivation of the blanking pulse from transmitted pulse energy and the lengthening of the derived pulse in order to provide complete blanking in the simple manner illustrated result in a blanking circuit that is both simple and inexpensive, with minimum possibility of malfunctioning except through actual failure of the components used, and one wherein reasonable or moderate variations in the design values of the blanking circuit components do not adversely affect its operation.

I claim as my invention:

1. In a pulse transmission-reception system having therein a receiving channel subject to directly-received transmitted pulse energy, said receiving channel including a bias control element capable, when impressed with at least a predetermined minimum blanking voltage, of blanking such receiver channel against passage of transmitted pulse energy therethrough, the combination comprising vacuum tube amplifier-detector means having an input element arranged to be impressed with transmitted pulse energy and having an anode-cathode circuit including a source of voltage and a load resistor connected in series with said source and said means, a storage condenser having one side connected to a point of substantially constant potential and its opposite side connected to a point between said load resistor and said amplifier-detector means, said condenser being discharged by operation of said amplifier-detector means during the transmitted pulse and its voltage being thereby dropped by an amount materially in excess of the minimum blanking voltage, said condenser thereafter recharging through said resistor, the time-constant of the condenser discharge path appreciably delaying recovery of condenser voltage to such minimum blanking voltage, said drop of voltage and recovery of voltage on said storage condenser forming a blanking pulse, and means comprising a direct-current blocking condenser interconnecting said storage condenser and the bias control element for application of said blanking pulse to said bias control element, and rectifier means connected to a point between said bias control element and said blocking condenser to remove accumulated charge from the blocking condenser immediately following recharging of said storage condenser.

2. In a pulse transmission-reception system having therein a receiving channel subject to directly received transmitted pulse energy, said receiving channel including a bias control element capable, when impressed with at least a predetermined minimum blanking voltage, of blanking such receiver channel against passage of transmitted pulse energy therethrough, the combination comprising detector means arranged to be impressed with transmitted pulse energy and having in circuit therewith a storage condenser carrying a normal charge abruptly changed in voltage by an amount materially in excess of said minimum blanking voltage by operation of said detector means during the transmitted pulse, and a normal-charge recovery path for said condenser including a resistor, the time-constant of said path appreciably delaying recovery of condenser voltage to such minimum blanking voltage following termination of the transmitted pulse, said abrupt change and delayed recovery of condenser charge voltage forming a blanking pulse, a direct-current blocking condenser interconnecting said storage condenser and the bias control element for application of said blanking pulse to said element, and rectifier means connected to a point between said bias control element and said blocking condenser to remove accumulated charge from the blocking condenser immediately following recovery of said storage condenser.

3. In a pulse transmission-reception system having therein a receiving channel subject to directly-received transmitted pulse energy, said receiving channel including a bias control element capable, when impressed with at least a predetermined minimum blanking voltage, of blanking such receiver channel against passage of transmitted pulse energy therethrough, the combination comprising detector means arranged to be impressed with transmitted pulse energy for producing a corresponding direct voltage pulse in said detector means of an amplitude materially in excess of said minimum blanking voltage, means comprising an energy storage reactance element connected in energy exchange relationship with said detector means for preventing abrupt decay of said direct voltage pulse to such minimum blanking voltage upon termination of the transmitted pulse, circuit means comprising a direct-current blocking condenser applying such direct voltage pulse to said receiver channel control element, and rectifier means connected to said blocking condenser to remove accumulated charge from the blocking condenser immediately following discharge of said energy storage reactance means.

References Cited in the file of this patent

UNITED STATES PATENTS

| | | |
|---|---|---|
| 2,446,960 | Seebinger | Apr. 10, 1948 |
| 2,449,358 | Zappacosta | Sept. 14, 1948 |
| 2,476,902 | Paine | July 19, 1949 |
| 2,569,297 | Duke | Sept. 25, 1951 |
| 2,637,772 | Wendt | May 5, 1953 |